Nov. 27, 1951           C. E. ROSE           2,576,857
NEON LIGHT FOR AUTOMOBILE RADIATOR CAPS
Filed Nov. 4, 1948
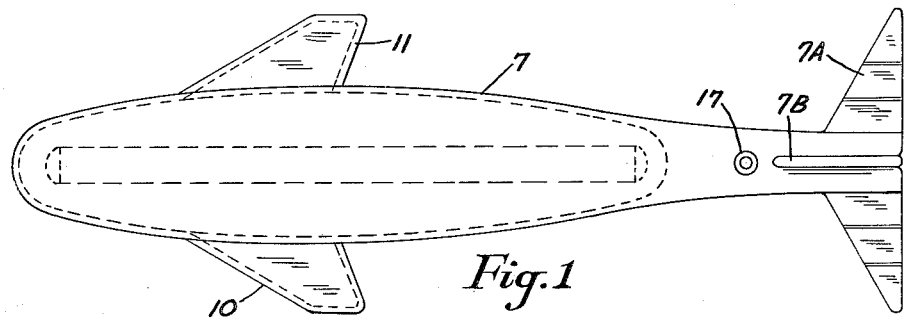
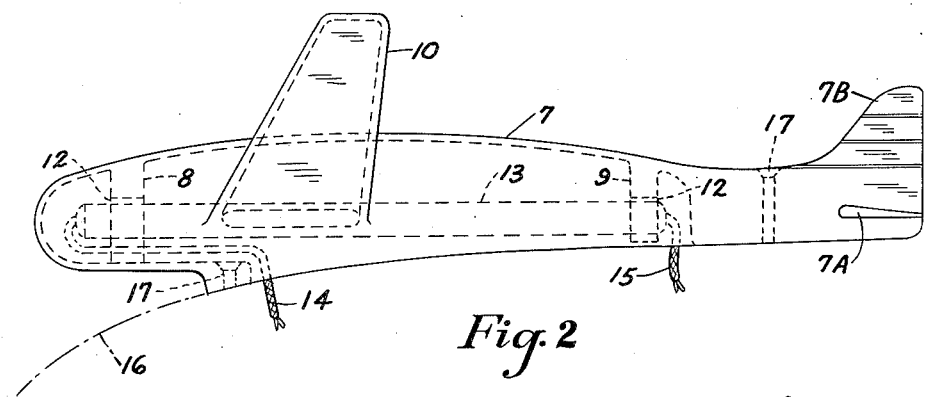
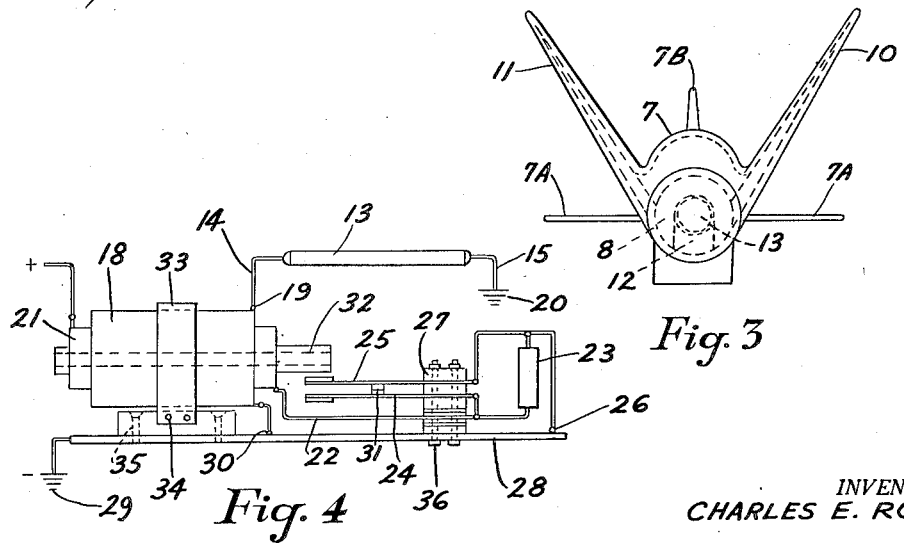
INVENTOR.
CHARLES E. ROSE
BY *Edward M. Apple*
ATTORNEY Patented Nov. 27, 1951

2,576,857

UNITED STATES PATENT OFFICE 2,576,857

NEON LIGHT FOR AUTOMOBILE RADIATOR CAPS

Charles E. Rose, Detroit, Mich.

Application November 4, 1948, Serial No. 58,348

3 Claims. (Cl. 240—8.11)

This invention relates to accessories for automobiles and has particular reference to a neon light radiator or hood ornament.

An object of the invention is to provide an automobile radiator or hood ornament which is provided with a neon tube which is electrically connected to the ignition system of the automobile.

Another object of the invention is to provide a neon light ornament for an automobile which is constructed and arranged so that it is possible to effect different color combinations.

Another object of the invention is to provide a special circuit for a device of the character indicated, the principal parts of which may be compactly assembled for easy connection to the electrical circuit of the automobile.

The foregoing and other objects and advantages of the invention will become more apparent as the description proceeds, reference being made from time to time to the accompanying drawings, forming part of the within disclosure, in which drawings:

Fig. 1 is a top plan view of a radiator or hood ornament embodying the invention.

Fig. 2 is a side elevational view of the device shown in Fig. 1.

Fig. 3 is a front elevational view of the device shown in Figs. 1 and 2.

Fig. 4 is a diagrammatic view of the electrical circuit employed with the device.

Referring now more particularly to the drawings, it will be understood that the reference character 7 indicates the body or shell of the ornament, which is preferably made of a transparent plastic material, and streamlined to the contours shown in Figs. 1 and 2.

The body 7 is preferably hollow throughout most of its length, and is formed with internal struts 8 and 9 and hollow wings 10 and 11. The body 7 terminates in simulated elevators 7A and rudder 7B.

The struts 8 and 9 have slightly tapered slots 12 formed in the bottom end thereof, which slots are adapted to accommodate the neon tube 13 which is preferably press fitted therein, and which is provided with electrical leads 14 and 15 adapted to be connected in the electrical circuit as hereinafter described.

The body 7 may be secured to the hood 16 of an automobile (Fig. 2) by means of screws 17, or other suitable means.

I prefer to paint, or otherwise color, the hollow interiors of the wings 10 and 11 so that different color effects may be effected.

In order to operate the neon tube 13 through the electrical system of the automobile, I provide a novel circuit assembly with means for interrupting and transforming the circuit which I will now describe (Fig. 4).

One side of the neon tube 13 is connected through the lead 14 to the secondary winding 18 of a transformer, as at 19. The other end of the neon tube is grounded through the lead 15, as at 20. The primary winding 21 of the transformer is connected at any suitable point in the ignition system of the automobile. The other side of the primary winding 21 is connected through the lead 22 to a condenser 23, and to one side of a vibrator mechanism 24. The other side 25 of the vibrator mechanism is connected to the condenser 23, and is grounded, as at 26.

The vibrator elements 24 and 25 are mounted on the insulating element 27 which is secured to a suitable base 28 which in turn is grounded, as at 29, and to which the opposite end of the secondary winding 18 is grounded, as at 30. It will be noted that the circuit is at all times closed through the vibrator points 31, and the circuit is interrupted when the flux in the core 32 is sufficient to move the arm 25 resulting in the separation of the points 31.

The entire assembly consisting of the transformer, vibrator and condenser is conventionally mounted on the base 28 by various means including a strap 33, screws or bolts 34, 35 and 36.

Having described my invention, what I claim and desire to secure by Letters Patent is:

1. A device of the character described adapted to be secured to the hood of an automotive vehicle and consisting of an integrated hollow transparent body simulating the fuselage of an airplane, the said fuselage having integral internal struts formed therein, there being tapered slots in said struts arranged to accommodate a neon tube, and a neon tube press fitted in said slots.

2. The structure defined in claim 1, in which said fuselage has a longitudinal opening along its underside arranged for the insertion of said neon tube.

3. The structure defined in claim 1, including angularly directed hollow wings communicating with the interior of said fuselage, the said wings having coloring mediums therein.

CHARLES E. ROSE.

REFERENCES CITED

The following references are of record in the file of this patent:

UNITED STATES PATENTS

| Number | Name | Date |
|---|---|---|
| 1,824,003 | Wilson | Sept. 22, 1931 |
| 1,839,055 | Seegelken | Dec. 29, 1931 |
| 1,866,802 | Gragg et al. | July 12, 1932 |
| 2,113,919 | Korematsu | Apr. 12, 1938 |
| 2,499,824 | Haecker | Mar. 7, 1950 |
| 2,501,160 | Clarke | Mar. 21, 1950 |

FOREIGN PATENTS

| Number | Country | Date |
|---|---|---|
| 602,524 | Germany | Dec. 29, 1932 |